United States Patent
Ryu et al.

(10) Patent No.: US 10,273,560 B2
(45) Date of Patent: Apr. 30, 2019

(54) RECOVERY METHOD OF USEFUL RESOURCES IN SEAWATER AND BRINE

(71) Applicant: KOREA INSTITUTE OF GEOSCIENCE AND MINERAL RESOURCES, Daejeon (KR)

(72) Inventors: Jungho Ryu, Daejeon (KR); Hye-Jin Hong, Daejeon (KR); Byoung-Gyu Kim, Daejeon (KR); In-Su Park, Gyeryong-si (KR); Taegong Ryu, Daejeon (KR); Kang-Sup Chung, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 280 days.

(21) Appl. No.: 15/097,332

(22) Filed: Apr. 13, 2016

(65) Prior Publication Data
US 2017/0029920 A1 Feb. 2, 2017

(30) Foreign Application Priority Data
Jul. 31, 2015 (KR) .................. 10-2015-0108467

(51) Int. Cl.
| | | |
|---|---|---|
| C22B 7/00 | (2006.01) |
| C22B 26/20 | (2006.01) |
| C22B 26/12 | (2006.01) |
| B01J 20/02 | (2006.01) |
| B01J 20/06 | (2006.01) |
| B01J 20/20 | (2006.01) |
| B01J 20/28 | (2006.01) |
| C02F 1/28 | (2006.01) |

(52) U.S. Cl.
CPC ............... C22B 7/005 (2013.01); B01J 20/02 (2013.01); B01J 20/06 (2013.01); B01J 20/20 (2013.01); B01J 20/2803 (2013.01); C02F 1/28 (2013.01); C22B 26/12 (2013.01); C22B 26/20 (2013.01); Y02P 10/212 (2015.11)

(58) Field of Classification Search
CPC ................................ C22B 7/005; C22B 26/20
See application file for complete search history.

(56) References Cited

U.S. PATENT DOCUMENTS

| 4,201,827 A | * | 5/1980 | Heitkamp | .......... B01J 20/28009 210/222 |
| 2009/0314717 A1 | * | 12/2009 | Fujieda | ................... B01J 20/26 210/663 |
| 2017/0029920 A1 | * | 2/2017 | Ryu | ....................... B01J 20/02 |

FOREIGN PATENT DOCUMENTS

KR 101238898 B1 3/2013

* cited by examiner

*Primary Examiner* — Scott R Kastler
(74) *Attorney, Agent, or Firm* — Hauptman Ham, LLP

(57) ABSTRACT

Provided is a recovery method of useful resources in seawater and brine, and more particularly, a recovery method of useful resources in seawater and brine capable of improving adsorption efficiency and recovery efficiency of trace amounts of useful resources such as strontium, lithium, boron, or the like, present in brine at low cost by using a magnetic adsorbent composite and a solid-liquid separation process which uses magnetic force.

11 Claims, 3 Drawing Sheets

[FIG. 1]
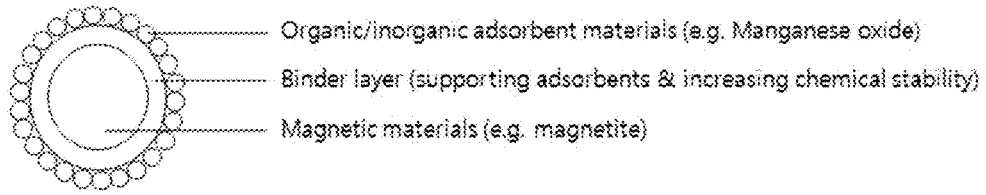
[FIG. 2]
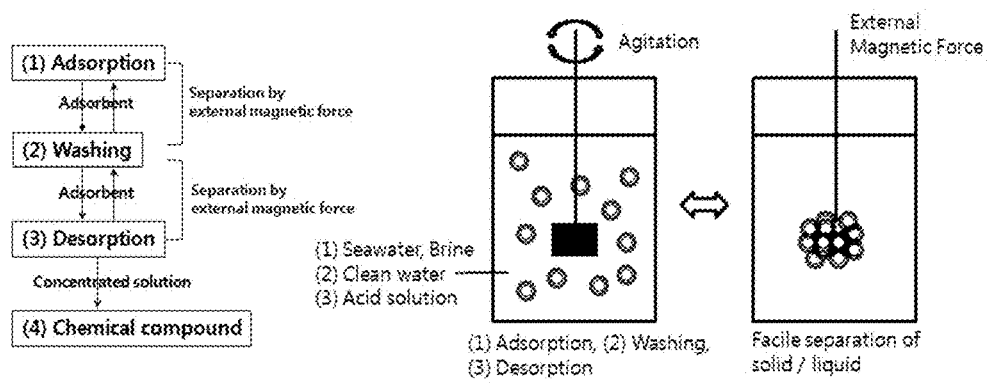

[FIG. 3]
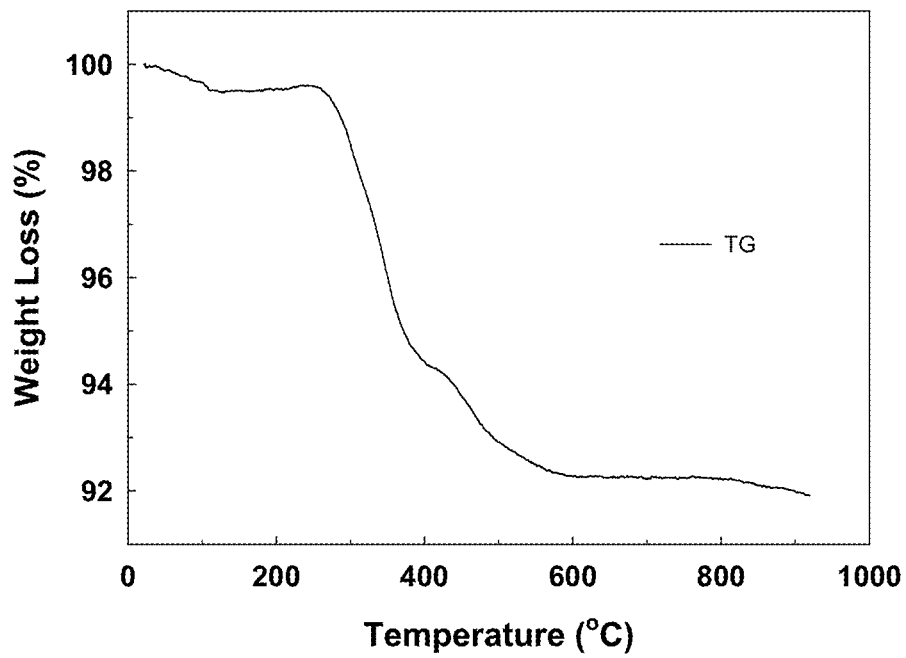
[FIG. 4]
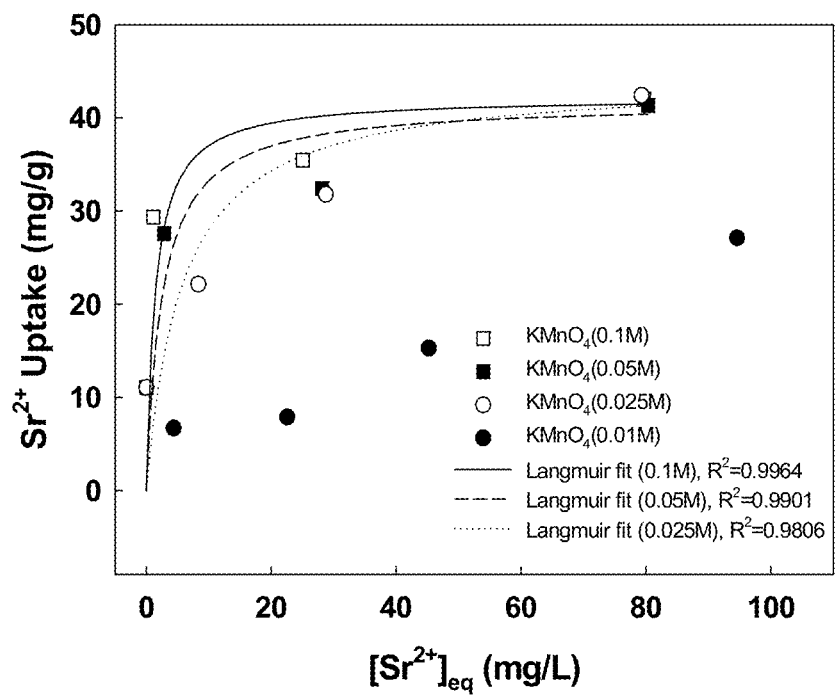

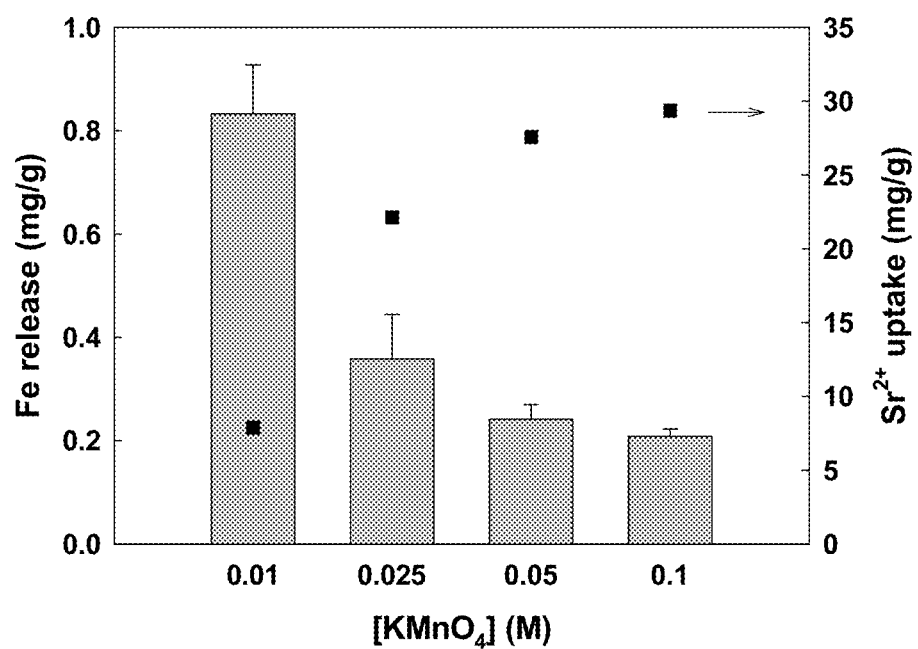
[FIG. 5]

RECOVERY METHOD OF USEFUL RESOURCES IN SEAWATER AND BRINE

CROSS-REFERENCE TO RELATED APPLICATIONS

This application claims priority under 35 U.S.C. § 119 to Korean Patent Application No. 10-2015-0108467, filed on Jul. 31, 2015, in the Korean Intellectual Property Office, the disclosure of which is incorporated herein by reference in its entirety.

TECHNICAL FIELD

The following disclosure relates to a recovery method of useful resources in seawater and brine, and more particularly, to a recovery method of useful resources in seawater and brine capable of improving adsorption efficiency and recovery efficiency of trace amounts of useful resources such as strontium, lithium, boron, or the like, present in brine at low cost by using a magnetic adsorbent composite and a solid-liquid separation process which uses magnetic force.

BACKGROUND

As one of the alternatives for overcoming a limited abundance of land resources, technology for recovering trace amounts of useful resources from seawater or brine has been actively developed. The seawater or brine of which reserves are infinite has an advantage in view of abundance, but various matrix ions are present therein, and concentrations of the useful resources to be recovered such as lithium, strontium, boron, or the like, are relatively low, such that it is essential to develop a technology capable of selectively separating these useful resources.

It was reported that among methods for selectively separating a target material having a low concentration, a method using adsorption is most efficient. Therefore, it is most important to develop highly efficient and highly selective adsorbent material.

Particularly, a recovery method using a manganese oxide based inorganic adsorbent having highly selective ion exchange characteristics has been widely used as one of the most preferable methods, and thus, various manganese oxide based inorganic adsorbents have been developed.

For example, a technology of recovering useful metals from concentrated water using a manganese oxide based inorganic adsorbent has been disclosed in Korean Patent No. 10-1238898 (Patent Document 1). This technology, which may adsorb the lithium ions in a liquid by ion exchange between hydrogen ions and lithium ions in the liquid containing the lithium ions, that is, topotactic extraction and then recover the lithium ion from an inorganic adsorbent adsorbing the lithium ion through ion exchange between hydrogen ions and the lithium ion in a dilute aqueous hydrochloric acid solution, has an advantage in that the manganese oxide based inorganic adsorbent may be repetitively used.

However, since these inorganic adsorbents according to the related art are prepared in a form of powder, in order to actually apply these inorganic adsorbents to a recovery process, a solid-liquid separation device or a formation and assembling technology for fixation has been required. In the case of using a solid-liquid separation device according to the related art such as a device for filtration and centrifugation, there are disadvantages in that a process may be complicated, a loss of an adsorbent material may be incurred, and a process time may also be increased, and in case of using a formed and assembled adsorbent, there is a disadvantage in that adsorption performance may be deteriorated as compared to a powdery adsorbent material. Therefore, a process technology capable of applying a powdery adsorbent material as it is to improve recovery efficiency has been required.

RELATED ART DOCUMENT

[Patent Document]
(Patent Document 1) Korean Patent No. 10-1238898 (Dec. 2, 2013)

SUMMARY

An embodiment of the present invention is directed to providing a recovery method of useful resources in seawater and brine capable of improving adsorption efficiency and recovery efficiency with high efficiency and at low cost while using a powdery adsorbent by preparing a magnetic adsorbent composite capable of performing efficient solid-liquid separation to optimize a solid-liquid separation step required in each of the recovery processes of the useful resources such as strontium, lithium, boron, or the like.

Another embodiment in the present invention is directed to providing a magnetic adsorbent composite for recovering useful resources in seawater and brine, applied to the recovery method as described above.

In one general aspect, a recovery method of useful resources in seawater and brine includes: (a) adsorbing useful resources in the seawater and brine using a magnetic adsorbent composite; (b) obtaining a useful resource desorption solution in which the useful resources are concentrated by desorbing the useful resources adsorbed in the magnetic adsorbent composite using a desorption solution; and (c) obtaining a compound from the useful resource desorption solution.

The magnetic adsorbent composite may have a multilayer structure in which a core layer is made of magnetic particles, an adsorbent material layer is formed by coating a useful resource-adsorbent material on a surface of the core layer, and a binder layer is further formed between the core layer and the adsorbent material layer.

The useful resource may be one or two or more selected among lithium, strontium, and boron.

Although not limited, the magnetic particles may be made of one or two or more selected among iron, nickel, cobalt, manganese, gadolinium and oxides thereof, magnetite, maghemite, iron monoxide, iron nitride, a cobalt platinum chromium alloy, a barium ferrite alloy, an aluminum manganese alloy, an iron platinum alloy, an iron palladium alloy, a cobalt platinum alloy, and a samarium cobalt alloy, the binder layer may contain carbon, and the adsorbent material may include manganese and manganese oxides.

The magnetic adsorbent composite may be prepared by a preparation method including: (1) mixing magnetic particles and a carbon precursor to prepare a mixture; (2) reacting the mixture at 150 to 250° C. to prepare magnetic particles on which a carbon layer is formed; and (3) mixing and reacting the magnetic particles on which the carbon layer is formed with an adsorbent material precursor solution.

In step (1), 50 to 300 parts by weight of the carbon precursor may be contained in the mixture based on 100 parts by weight of the magnetic particles, and the preparation method may further include after step (2) and step (3), separating the magnetic particles using magnetic force, washing the separated magnetic particles, and then drying the washed magnetic particles.

In step (3), a concentration of the adsorbent material precursor solution may be 0.01 to 1M, and a reaction may be carried out under room temperature and atmospheric pressure conditions for 120 hours or more.

The recovery method may further include, after step (a) and step (b), dispersing and washing the magnetic adsorbent composite in which the useful resources are adsorbed or from which the useful resources are desorbed in clean water, and separating the magnetic adsorbent composite using magnetic force.

The seawater and brine may be seawater and brine from which dissolved magnesium and calcium are removed using a seawater electrolytic process, respectively.

In the seawater electrolytic process, dissolved magnesium and calcium may be removed by applying a current of 0.2 to 1.2 $kA/m^2$ to an anode using brine as electrolyzed water of an anode side and seawater as electrolyzed water of a cathode side.

In another general aspect, a magnetic adsorbent composite includes: a core layer containing a magnetic particle; a binder layer containing carbon coated on a surface of the core layer; and an adsorbent material layer formed by coating a useful resource-adsorbent material on the binder layer.

The binder layer may have an average thickness of 5 to 20 nm and be contained in the entire magnetic adsorbent composite in a content range of 5 to 15 wt %, and the adsorbent material layer may be contained in the entire magnetic adsorbent composite in a content range of 10 to 35 wt %.

Other features and aspects will be apparent from the following detailed description, the drawings, and the claims.

BRIEF DESCRIPTION OF THE DRAWINGS

FIG. 1 is a schematic view of a magnetic adsorbent composite according to an exemplary embodiment of the present invention.

FIG. 2 is a schematic view illustrating a recovery method of useful resources in seawater and brine according to an exemplary embodiment of the present invention.

FIG. 3 is a graph illustrating a thermogravimetric analysis result of magnetic particles on which a carbon layer prepared according to Example of the present invention is formed.

FIG. 4 is a graph illustrating strontium adsorption ability of a magnetic adsorbent composite prepared according to Example of the present invention depending on a content of a manganese compound.

FIG. 5 is a graph illustrating a content of iron released from a magnetic adsorbent composite prepared according to Example of the present invention after a desorption process.

DETAILED DESCRIPTION OF EMBODIMENTS

Hereinafter, a recovery method of useful resources in seawater and brine according to an exemplary embodiment of the present invention and a measurement method of physical properties will be described in detail. The present invention relates to a magnetic adsorbent composite and a recovery method of useful resources using the same. The present invention will be understood and appreciated more fully from the following embodiments, and the following embodiments are for illustrating the present invention and not for limiting the present invention defined by the accompanying claims.

The present inventors studied in order to develop an inorganic adsorbent capable of performing efficient solid-liquid separation while using a powdery adsorbent, and as a result, the present inventors found that chemical resistance and durability of a magnetic adsorbent composite under acid-base conditions at the time of adsorption, washing, desorption, and washing may be secured by allowing carbon to be contained in a binder layer of the magnetic adsorbent composite, and adsorption and recovery efficiency may be improved with high efficiency and at low cost by optimizing a solid-liquid separation step, thereby completing the present invention.

An exemplary embodiment of the present invention provides a magnetic adsorbent composite having a multilayer structure, including a core layer, a binder layer containing carbon, and an adsorbent material layer.

Another exemplary embodiment of the present invention provides a preparation method of the magnetic adsorbent composite having a multilayer structure as described above.

Still another exemplary embodiment of the present invention provides a recovery method of useful resources in seawater and brine through a solid-liquid separation process of magnetic separation using the magnetic adsorbent composite having a multilayer structure as described above.

Hereinafter, the exemplary embodiment of the present invention will be described in detail.

As one of the alternatives for overcoming a limited abundance of land resources, technology for recovering trace amounts of useful resources from seawater or brine has been actively developed. These useful resources have been used in significantly wide fields such as ceramics, secondary battery materials, refrigerant adsorbents, medicines, and the like, and have also been spotlighted as resources for nuclear fusion energy. More specifically, one or two or more may be selected from lithium, strontium, and boron, but the useful resources are not limited thereto.

According to the exemplary embodiment of the present invention, the magnetic adsorbent composite capable of effectively adsorbing and recovering the above-mentioned useful resources may have a multilayer structure in which a core layer is made of a magnetic particle, an adsorbent material layer is formed by coating a useful resource-adsorbent material on a surface of the core layer, and a binder layer is further formed between the core layer and the adsorbent material layer.

The magnetic particles may be particles adsorbing the useful resources at the time of performing the solid-liquid separation process of magnetic separation. Any magnetic particles apparently known in the art may be used as long as the magnetic particles have magnetic properties. For example, the magnetic particles may be made of one or two or more selected among iron, nickel, cobalt, manganese, gadolinium and oxides thereof, magnetite, maghemite, iron monoxide, iron nitride, a cobalt platinum chromium alloy, a barium ferrite alloy, an aluminum manganese alloy, an iron platinum alloy, an iron palladium alloy, a cobalt platinum alloy, and a samarium cobalt alloy.

More preferably, the magnetic particles may be made of one or two or more selected among iron, nickel, magnetite, and maghemite, which are more effective in that when the magnetic adsorbent composite is prepared later, magnetic force does not deteriorate, and chemical resistance and durability may be maintained.

According to the exemplary embodiment of the present invention, an average particle size of the magnetic particles is not limited as long as the magnetic particles may be dispersed in seawater and brine, but in consideration of dispersibility, the average particle size of the magnetic particles may be 1 nm to 10 mm. More preferably, the average particle size of the magnetic particles may be 5 nm to 1 mm in order to improve adsorption efficiency, but is not limited thereto.

According to the exemplary embodiment of the present invention, the binder layer containing carbon may be formed on the surfaces of the magnetic particles in order to easily coat the adsorbent material capable of adsorbing the useful resources.

As the binder layer containing carbon is present in the magnetic adsorbent composite according to the present invention, chemical stability of the magnetic particles may be secured, and at the same time, the binder layer may serve as a supporter capable of forming a composite in which the adsorbent material is formed on the surface of the magnetic particle.

The binder layer may have an average thickness of 5 to 20 nm, more preferably, 8 to 15 nm, but is not limited thereto. Further, the binder layer may be contained in the entire magnetic adsorbent composite in a content range of 5 to 15 wt %, more preferably 6 to 10 wt %.

The average thickness and the content of the binder layer are within the above-mentioned range, which is more effective in that chemical stability may be improved by uniformly forming the binder layer on the surfaces of the magnetic particles, and the binder layer may serve as the supporter on which the adsorbent material layer is formed.

In order to form a manganese oxide layer in a core-shell structure according to the related art, a hydrothermal reaction was generally used, but in this case, there were problems such as a complicated process and high cost. However, in the case of forming the binder layer containing carbon on the surfaces of the magnetic particles as in the present invention, a plurality of pi (n) electrons which are present on a surface of carbon may act as Lewis bases to facilitate adsorption of protons, thereby facilitating adsorption of $MnO_4^-$ ions. That is, since conditions for directly initiating oxidation reduction reactions are made, an adsorbent material layer, that is, a manganese oxide ($MnO_2$) layer may be formed on a carbon layer uniformly formed on the surfaces of the magnetic particles under room temperature and atmospheric pressure conditions only by agitating as illustrated in the following [Reaction Formula 1]. Therefore, a preparation process of the magnetic adsorbent composite may be simple, and the magnetic adsorbent composite may be easily mass-produced, which are effective in view of recovering the useful resources.

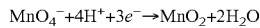

$$MnO_4^- + 4H^+ + 3e^- \rightarrow MnO_2 + 2H_2O \qquad \text{[Reaction Formula 1]}$$

As the useful resource-adsorbent material, any adsorbent material apparently known in the art may be used without limitation, but it is more preferable that the adsorbent material includes one or more of manganese and manganese oxides. The manganese and manganese oxides have excellent selectivity to lithium, strontium, and boron, the manganese and manganese oxides may easily and efficiently recover lithium, strontium, and boron.

Particularly, for example, the manganese oxide may be a spinel type manganese oxide, more specifically, a hydrous manganese oxide or a Birnessite-type manganese oxide. However, a form of the manganese oxide is not limited as long as it may adsorb the useful resources.

A content of the adsorbent material layer is not limited, but may be contained in the entire magnetic adsorbent composite in a range of 10 to 35 wt %, more preferably 12 to 30 wt %.

When the content of the adsorbent material layer is within the above-mentioned range, the useful resources may be easily adsorbed, and even in the case of repetitively performing adsorption and desorption reactions, an adsorption rate may not be decreased.

According to the exemplary embodiment, the preparation method of a magnetic adsorbent composite may include:

(1) mixing magnetic particles and a carbon precursor to prepare a mixture;

(2) reacting the mixture at 150 to 250° C. to prepare magnetic particles on which a carbon layer is formed; and (3) mixing and reacting the magnetic particles on which the carbon layer is formed with an adsorbent material precursor solution.

In more detail, in step (1), 50 to 300 parts by weight of the carbon precursor may be mixed and contained in the mixture based on 100 parts by weight of the magnetic particles. The carbon precursor is contained in the above-mentioned range, such that a binder layer may be uniformly formed on a surface of the magnetic particle.

The carbon precursor, which may form the binder layer containing carbon, may be one or two or more selected from glucose, citric acid, and polyethylene glycol (PEG), but is not limited thereto.

The carbon precursor may have a weight average molecular weight of 130 to 250 g/mol and a melting point of 130 to 200° C., but is not limited thereto. The carbon precursor having a weight average molecular weight and a melting point within the above-mentioned ranges is used, which is effective in that the binder layer may be uniformly formed on the surface of the magnetic particle.

In the case in which a content of the carbon precursor is less than 50 parts by weight, the binder layer may not be sufficiently formed on the surface of the magnetic particle, such that a shell layer on which the adsorbent material is coated may not be stably formed, and as a result, an adsorption rate of useful resources may be insufficient. In the case in which the content of the carbon precursor is more than 300 parts by weight, an excessive amount of the carbon precursor may be unnecessarily used, such that process cost such as material cost, or the like, may be increased.

As a mixing method of the magnetic particles and the carbon precursor, any mixing method apparently known in the art may be used without limitation. For example, the magnetic particles and the carbon precursor may be mixed by an impeller stirrer, supersonic mixer, or the like.

In the preparation method of a magnetic adsorbent composite according to the exemplary embodiment of the preset invention, step (2) is a step of reacting the mixture of the magnetic particles and the carbon precursor at 150 to 250° C. to prepare the magnetic particles on which the carbon layer, that is, the binder layer containing carbon, is formed.

As the carbon layer is formed by reacting the mixture in the above-mentioned temperature range, it is possible to form the binder layer of which binding strength with the magnetic particles is excellent and on which the adsorbent material may be uniformly coated.

In the case in which a reaction temperature in step (2) is lower than 150° C., the carbon layer is not uniformly formed, such that it is difficult to secure chemical stability of the magnetic particles, and in the case in which the reaction temperature is higher than 250° C., energy may be unnecessarily wasted, such that process cost may be increased.

In the preparation method of a magnetic adsorbent composite according to the exemplary embodiment of the preset invention, step (3) is a step of reacting the magnetic particles on which the carbon layer is formed with the adsorbent material precursor solution to prepare the magnetic adsorbent composite.

The adsorbent material precursor solution may be a manganese or manganese oxide solution, and the adsorbent material precursor solution may react with the carbon layer formed on the surfaces of the magnetic particles to form the adsorbent material layer on a surface of the carbon layer.

A concentration of the adsorbent material precursor solution according to the exemplary embodiment of the present invention is not limited, but may be 0.01M to 1.0M, more preferably, 0.05 to 0.5M. The concentration of the adsorbent material precursor solution is within the above-mentioned range, which is effective in that the adsorbent material layer having excellent chemical resistance and durability may be uniformly formed.

As a reaction condition in step (3) according to the exemplary embodiment of the present invention, any reaction condition apparently known in the art may be applied without limitation. For example, a reaction may be carried out for 120 hours or more, more preferably, for 140 to 240 hours under room temperature and atmospheric conditions, but is not limited thereto.

The adsorbent material layer may be formed under room temperature and atmospheric pressure conditions, which is effective in that the adsorbent material layer may be uniformly formed by a simple process at low cost as compared to the hydrothermal reaction according to the related art. Further, the longer the reaction time, the thicker the thickness of the formed adsorbent material layer, such that durability of the magnetic adsorbent composite may be increased.

According to the exemplary embodiment of the present invention, the preparation method may further include after step (2) and step (3), separating the magnetic particles using magnetic force, washing the separated magnetic particles, and then drying the washed magnetic particles.

According to another exemplary embodiment of the present invention, there is provided a recovery method of useful resources in seawater and brine using the magnetic adsorbent composite prepared by the above-mentioned method.

The recovery method of useful resources in seawater and brine may include:

(a) adsorbing useful resources in the seawater and brine using a magnetic adsorbent composite;

(b) obtaining a useful resource desorption solution in which the useful resources are concentrated by desorbing the useful resources adsorbed in the magnetic adsorbent composite using a desorption solution; and (c) obtaining a compound from the useful resource desorption solution.

The seawater and brine used according to the exemplary embodiment of the present invention are not limited, but may be seawater from which dissolved magnesium and calcium are removed, and more specifically, seawater from which dissolved magnesium and calcium are removed using a brine electrolytic process may be used. Purity and selectivity of the useful resources recovered by the magnetic adsorbent composite according to the present invention may be improved by using the seawater and brine from which magnesium and calcium are removed.

In the brine electrolytic process, dissolved magnesium and calcium may be removed by applying a current of 0.2 to 1.2 $kA/m^2$ to an anode using brine as electrolyzed water of an anode side and seawater as electrolyzed water of a cathode side, but are not limited thereto.

The recovery method may further include, after step (a) and step (b), dispersing and washing the magnetic adsorbent composite in which the useful resources are adsorbed or from which the useful resources are desorbed in clean water, and separating the magnetic adsorbent composite using magnetic force. This step is a step of washing the magnetic adsorbent composite in clean water and separating the washed magnetic adsorbent composite using magnetic force before injecting the magnetic adsorbent composite in which the useful resources dispersed in seawater and brine are adsorbed in a desorption process, or injecting the magnetic adsorbent composite from which the useful resources are desorbed in an adsorption process again.

Step (b) is a step of separating the washed magnetic adsorbent composite in which the useful resources are adsorbed again using magnetic force and then dispersing the separated magnetic adsorbent composite in the desorption solution capable of separating the adsorbed useful resources to perform a desorption reaction of the useful resources.

As the desorption solution, any acidic solution or calcium solution apparently known in the art may be used as long as it may desorb the useful resources. A concentration of the desorption solution may be changed depending on an adsorption and desorption concentration of the useful resources, and may also be changed depending on the kind of seawater. For example, the concentration of the desorption solution may be 0.05 to 1.0M, but is not limited thereto.

Step (c) may include the obtaining of the compound from the useful resource desorption solution.

As a method of obtaining the compound from the useful resource desorption solution, a method apparently known in the art may be used. For example, precipitates of the useful resources may be separated using a carbonate buffer solution or a weak alkali solution as an eluate, and the useful resources may be recovered by washing and drying the separated precipitates of the useful resources, but the present invention is not limited thereto.

Hereinafter, the recovery method of useful resources in seawater and brine according to an exemplary embodiment of the present invention and a measurement method of physical properties will be described in detail.

Measurement of Physical Properties

1. Transmission Electron Microscope (TEM)

Physical properties were measured using a field emission transmission electron microscope (FE-TEM, JEM-2000F, JEOL Corp.).

2. Thermogravimetric Analysis (TGA)

TGA was performed using LABSYS EVO (SETARAM Instrumentation Corp.) under air conditions.

3. Inductively Coupled Plasma (ICP) Analysis

ICP analysis was performed using an inductively coupled plasma atomic emission spectrometer (ICP-AES, Optima 7300, Perkin-Elmer Corp.).

Example 1

Formation of Binder Layer on Magnetic Particle

A mixture in which 1 g of magnetite (average particle size: 75 nm) and 2 g of α-D-glucose (Aldrich) were put into 30 ml of distilled water was subjected to ultrasonication and then agitated for 20 minutes. The mixture was put into a 50 ml Teflon-lined autoclave and reacted at 200° C. for 12 hours, followed by cooling to room temperature. The resultant was separated using magnetic force and washed with distilled water and ethanol several times, followed by drying in an oven at 60° C., thereby preparing magnetic particles on which a binder layer was formed. It was confirmed through a TEM that a uniform binder layer having a thickness of 10 nm was formed. Further, results obtained by TGA analysis were illustrated in FIG. 3, and it was confirmed that a content of carbon was 7.36 wt %.

Preparation of Magnetic Adsorbent Composite 0.1 g of the magnetic particles on which the binder layer was formed was put into 30 ml of 0.01M $KMnO_4$ solution and subjected to ultrasonication. After reacting this solution while agitating the solution for 144 hours using a rotary shaker, the resultant was separated using magnetic force and washed with distilled water and ethanol, followed by drying in an oven at 60° C., thereby preparing a magnetic adsorbent composite. It was confirmed through TEM that an adsorbent material layer was uniformly formed on a surface of the binder layer. It was confirmed through ICP analysis that a content of manganese dioxide ($MnO_2$) was 15 wt %.

Examples 2 to 4

As illustrated in the following Table 1, magnetic adsorbent composites were prepared in the same manner as in Example 1 except for changing the concentration of the $KMnO_4$ solution to 0.025M, 0.05M, and 0.1M, respectively, at the time of preparing the magnetic adsorbent composites, and physical properties thereof were measured and illustrated in the following Table 2.

Comparative Example 1

As illustrated in the following Table 1, a magnetic adsorbent composite was prepared in the same manner as in Example 3 except that the binder layer was not formed, and physical properties thereof were measured and illustrated in the following Table 2.

Comparative Example 2

Formation of Binder Layer on Magnetic Particle

After 3.5 g of Igepal CO-520 was added to 44 mL of cyclohexane and mixed with each other, 4 mL of magnetite (average particle size: 75 nm) solution (concentration: 4 mg/mL in cyclohexane) was added thereto and agitated. Here, 0.35 mL of NH4OH was added thereto and mixed therewith and 2 mL of tetraethyl orthosilicate (TEOS) added thereto and agitated for 48 hours, followed by washing with methanol and drying, thereby preparing magnetic particles on which a $SiO_2$ binder layer was formed. It was confirmed through TEM that the $SiO_2$ binder layer was uniformly formed to have a thickness of 50 to 100 nm. It was confirmed through ICP analysis that a content of silica ($SiO_2$) was 50 wt %.

Preparation of Magnetic Adsorbent Composite 0.1 g of the magnetic particles on which the $SiO_2$ binder layer was formed was put into 30 ml of 0.1M $KMnO_4$ solution and subjected to ultrasonication. After reacting this solution while agitating the solution for 144 hours using a rotary shaker, the resultant was separated using magnetic force and washed with distilled water and ethanol, followed by drying in an oven at 60° C., thereby preparing a magnetic adsorbent composite. It was confirmed through ICP analysis that a content of manganese dioxide ($MnO_2$) was 2.35 wt %.

Experimental Example 1

Useful Resource Recovery Experiment

After strontium was added to distilled water at different concentrations of 12, 30, 60, and 120 mg/L, respectively, the magnetic adsorbent composites prepared in Examples 1 to 4 were added thereto under the condition that a solid/liquid ratio was 0.02 g/20 ml, respectively. Then, after performing a reaction for 30 minutes using a rotary shaker, the magnetic adsorbent composite was separated using magnetic force, and concentrations of strontium in filtrates were analyzed using ICP. A desorption experiment of adsorbed strontium ions was performed using 0.1M HCl solution under same condition (solid/liquid ratio=0.02 g/20 ml). Further, a release amount of iron ions was measured.

Experimental Example 2

Seawater Adsorption Experiment

After adding 0.02 g of the magnetic adsorbent composite prepared according to Example 4 to 20 mL of seawater and performing an adsorption reaction for 1 hour using a rotary shaker, the magnetic adsorbent composite was separated using magnetic force, and a concentration of strontium in a filtrate was analyzed using ICP. The concentration of strontium of the target seawater was measured as 7.64 mg/L, and adsorption ability was evaluated as 1.4 mg/g.

TABLE 1

|  | Magnetic Particle | | Binder Precursor | | Adsorbent Material Precursor $KMnO_4$ |
| --- | --- | --- | --- | --- | --- |
|  | Kind | Content | Kind | Content | Solution |
| Example 1 | Magnetite | 1 g | Glucose | 2 g | 0.01M |
| Example 2 | Magnetite | 1 g | Glucose | 2 g | 0.025M |
| Example 3 | Magnetite | 1 g | Glucose | 2 g | 0.05M |
| Example 4 | Magnetite | 1 g | Glucose | 2 g | 0.1M |
| Comparative Example 1 | Magnetite | 1 g | — | — | 0.1M |
| Comparative Example 2 | Magnetite | 1 g | TEOS | 2 mL | 0.1M |

TABLE 2

|  | Binder Layer | | Content (%) of $MnO_2$ | Strontium Adsorption Ability (mg/g) | Iron Ion Release Amount (mg/g) |
| --- | --- | --- | --- | --- | --- |
|  | Thickness (nm) | Content (%) | | | |
| Example 1 | 10 | 7.36 | 15 | 7.9 | 0.79 |
| Example 2 | 10 | 7.36 | 22 | 22.1 | 0.29 |
| Example 3 | 10 | 7.36 | 25 | 27.6 | 0.23 |
| Example 4 | 10 | 7.36 | 28 | 29.4 | 0.19 |
| Comparative Example 1 | — | — | 1.67 | 0.8 | 1.35 |
| Comparative Example 2 | 50~100 | 50 | 2.35 | 6.8 | 0.01 |

As illustrated in Table 2 and FIGS. 3 to 5, it may be appreciated that in the case of separating useful resources using the magnetic adsorbent composite according to the present invention, purity of the adsorbed useful resources was high, the adsorption ability was excellent, a process was easy, and adsorption efficiency and recovery efficiency were increased. Further, it may be appreciated that as the binder layer containing carbon was uniformly formed, the higher the concentration of the adsorbent material precursor, the higher the content of the adsorbent material layer. In addition, it may be appreciated that as the content of the adsorbent material was increased, the strontium adsorption ability was increased, and desorption ability was also similarly increased. In addition, it may be appreciated that the higher the content of the adsorbent material, the smaller the release amount of iron ions. Therefore, it may be appreciated that as the binder layer containing carbon was uniformly formed and the content of the adsorbent material was increased, the binder layer firmly and thickly enclosed the magnetic particles to inhibit infiltration of an acid, thereby improving chemical stability.

On the contrary, it may be appreciated that in the case in which the binder layer was not present as in Comparative Example 1, the adsorbent material layer was hardly formed, such that the strontium adsorption ability was decreased, and the release amount of the iron ions of the magnetic particles was increased. Further, in the case in which the silica binder layer was formed as in Comparative Example 2, as the silica binder layer was formed to be excessively thick, the release amount of the iron ions was slightly decreased. On the contrary, a specific surface area of the magnetic particle on which the silica binder layer was formed was 77.2 $m^2/g$, which was 11 times higher than a specific surface area (6.7 $m^2/g$) of the magnetic particle itself, but the content of the adsorbent material layer ($MnO_2$) was 2.35%. Therefore, it may be appreciated that the adsorbent material layer ($MnO_2$) was hardly formed. It may be appreciated that even though the specific surface area was increased, it was difficult to form the adsorbent material layer on the silica binder layer, and only when the carbon layer was present, the adsorbent material layer may be easily formed.

The recovery method of useful resources in seawater and brine according to the present invention may improve adsorption efficiency and recovery efficiency with high efficiency and at low cost by using a specific magnetic adsorbent composite to optimize the solid-liquid separation steps of magnetic separation.

Since a reaction of the magnetic adsorbent composite according to the present invention is induced at room temperature and atmospheric pressure, the magnetic adsorbent composite has advantages in that a preparation process may be simple and the magnetic adsorbent composite may be mass-produced.

Exemplary embodiments of the present invention were described above, but the present invention may include various changes, modifications, and equivalents. It will be appreciated that the present invention may be similarly applied by modifying the exemplary embodiments. Therefore, the above-mentioned contents are not for limiting the present invention defined by the accompanying claims.

What is claimed is:

1. A method for recovering a target element from seawater and brine, the method comprising:
   (a) exposing the seawater and brine to unbound particles of a magnetic adsorbent composite;
   (b) absorbing a first portion of the target element from the seawater and brine onto the magnetic adsorbent composite to form loaded magnetic adsorbent composite particles;
   (c) treating the loaded magnetic adsorbent composite particles with a desorption solution to release a second portion of the target element from the loaded composite to form a mixture of a loaded desorption solution and desorbed magnetic adsorbent composite particles;
   (d) recovering a third portion of the target element from the loaded desorption solution.

2. The method of claim 1, wherein:
the magnetic adsorbent composite has a comprising
   a core comprising a magnetic particle,
   a binder layer coating the core; and
   an adsorbent material layer coating the binder layer.

3. The method of claim 1, wherein:
the target element is selected from a group consisting of lithium, strontium, boron, and mixtures thereof.

4. The method of claim 2, wherein:
the magnetic particle comprises at least one material selected from a group consisting of iron, nickel, cobalt, manganese, gadolinium, and oxides thereof, magnetite, maghemite, iron monoxide, iron nitride, cobalt platinum chromium alloy, barium ferrite alloy, aluminum manganese alloy, iron platinum alloy, iron palladium alloy, cobalt platinum alloy, and samarium cobalt alloy;
the binder layer contains carbon; and
the adsorbent material comprises at least one material selected from a group consisting of manganese and manganese oxides.

5. The method of claim 1, wherein the magnetic adsorbent composite is prepared by a preparation method including:
   (1) mixing magnetic particles and a carbon precursor to prepare a treatment mixture;
   (2) heating the treatment mixture to a treatment temperature of from 150 to 250° C.; and thereby form a carbon-containing binder layer on the magnetic particles to form treated magnetic particles;
   (3) mixing the treated magnetic particles with an adsorbent material precursor solution to form a reaction mixture; and
   (4) maintaining the reaction mixture within a reaction temperature range and under a reaction pressure for a reaction period sufficient to form an absorbent material layer on the treated magnetic particles and obtain magnetic adsorbent composite particles.

6. The method of claim 5, wherein:
the treatment mixture comprises 50 to 300 parts by weight of the carbon precursor to every 100 parts by weight of the magnetic particles;
the carbon precursor is selected from a group consisting of glucose, citric acid, and polyethylene glycol (PEG), and mixtures thereof; and wherein
the preparation method further comprises includes
   separating the magnetic absorbent composite particles using magnetic force,
   washing the separated magnetic absorbent composite particles, and
   drying the washed magnetic absorbent composite particles.

7. The method of claim 5, wherein:
the adsorbent material precursor solution has an adsorbent material concentration of 0.01 to 1M;
the reaction temperature range is from 20 to 25° C.;
the reaction pressure is approximately 1 atm (10.1 $N/cm^2$); and
the reaction period is at least 120 hours.

8. The method of claim 1, further comprising:
   (e) separating the desorbed magnetic adsorbent composite particles from the resource desorption solution;

(f) washing the separated desorbed magnetic absorbent composite particles; and (g) drying the washed magnetic absorbent composite particles.

9. The method of claim 1, further comprising:

removing dissolved magnesium and calcium from the seawater and brine before the seawater and brine are exposed to the magnetic absorbent composite.

10. A magnetic adsorbent composite comprising:

a core comprising a magnetic particle having an exterior surface;

a binder layer containing carbon coating the exterior surface of the core layer; and an adsorbent material layer coating the binder layer;

wherein the binder layer has an average thickness of 5 to 20 nm and comprises between 5 and 15 wt % of a total weight of the magnetic adsorbent composite, and the absorbent material layer comprises between 10 and 35 wt % of the total weight of the magnetic adsorbent composite.

11. A method for recovering a target element from an aqueous saline solution, the method comprising:

(a) exposing the aqueous saline solution to a plurality of unbound magnetic adsorbent composite particles;

(b) absorbing a first portion of the target element from the aqueous saline solution onto the magnetic absorbent composite particles to form a loaded magnetic adsorbent composite particles;

(c) treating the loaded magnetic adsorbent composite particles with a desorption solution to release a second portion of the target element from the loaded magnetic adsorbent composite particles to form a mixture of a loaded desorption solution and desorbed magnetic adsorbent composite particles; and (d) recovering a third portion of the target element from the loaded desorption solution.

* * * * *